United States Patent

Gautier et al.

[11] Patent Number: 5,551,317
[45] Date of Patent: Sep. 3, 1996

[54] PEDAL DEVICE FOR A MOTOR VEHICLE, PARTICULARLY FOR A BRAKE SYSTEM

[75] Inventors: Jean-Pierre Gautier; Ulysse Verbo, both of Aulnay Sous Bois; Miguel Perez Revilla, Argenteuil, all of France

[73] Assignee: AlliedSignal Europe Services Techniques, Drancy, France

[21] Appl. No.: 122,559

[22] PCT Filed: Sep. 22, 1993

[86] PCT No.: PCT/FR93/00915

§ 371 Date: Mar. 20, 1995

§ 102(e) Date: Mar. 20, 1995

[87] PCT Pub. No.: WO94/07715

PCT Pub. Date: Apr. 14, 1994

[30] Foreign Application Priority Data

Oct. 7, 1993 [FR] France .................................. 92 11863

[51] Int. Cl.⁶ ...................................................... G05G 1/14
[52] U.S. Cl. ............................ 74/560; 74/512; 16/DIG. 6
[58] Field of Search .......................... 74/512, 513, 514,
74/560; 403/79, 157; 16/DIG. 6, DIG. 33,
342; 248/580, 632, 633, 634, 635

[56] References Cited

U.S. PATENT DOCUMENTS

| | | | |
|---|---|---|---|
| 2,312,274 | 2/1943 | Stortz | 74/513 |
| 3,250,144 | 5/1966 | Kansman | 74/513 |
| 3,347,501 | 10/1967 | Eimeren | 248/632 |
| 3,495,859 | 2/1970 | Hassan | 403/157 |
| 4,018,104 | 4/1977 | Bland et al. | 74/513 |
| 4,297,550 | 10/1981 | Leighton | 74/512 |
| 4,497,395 | 2/1985 | Nogami et al. | 74/512 |
| 5,078,024 | 1/1992 | Cicotte et al. | 74/512 |
| 5,146,805 | 9/1992 | Harkrader et al. | 16/342 |

FOREIGN PATENT DOCUMENTS

| | | | |
|---|---|---|---|
| 2268300 | 11/1975 | France . | |
| 2516659 | 10/1975 | Germany | 74/512 |
| 2543309 | 4/1977 | Germany . | |
| 8816385 | 7/1989 | Germany . | |

Primary Examiner—Rodney H. Bonck
Assistant Examiner—Chong H. Kim
Attorney, Agent, or Firm—Leo H. McCormick, Jr.

[57] ABSTRACT

The invention relates to a pedal for a motor vehicle, particularly a brake pedal.

The pedal rod (50) is articulated on a pin borne by a yoke securely attached to the end of the control rod (56). According to one embodiment, the yoke and the pedal rod are held against the pin by a resilient system constituted by a spring-forming wire (100) which interacts with the surface (54) of the pedal rod and the ends of which are securely attached to the yoke.

9 Claims, 3 Drawing Sheets

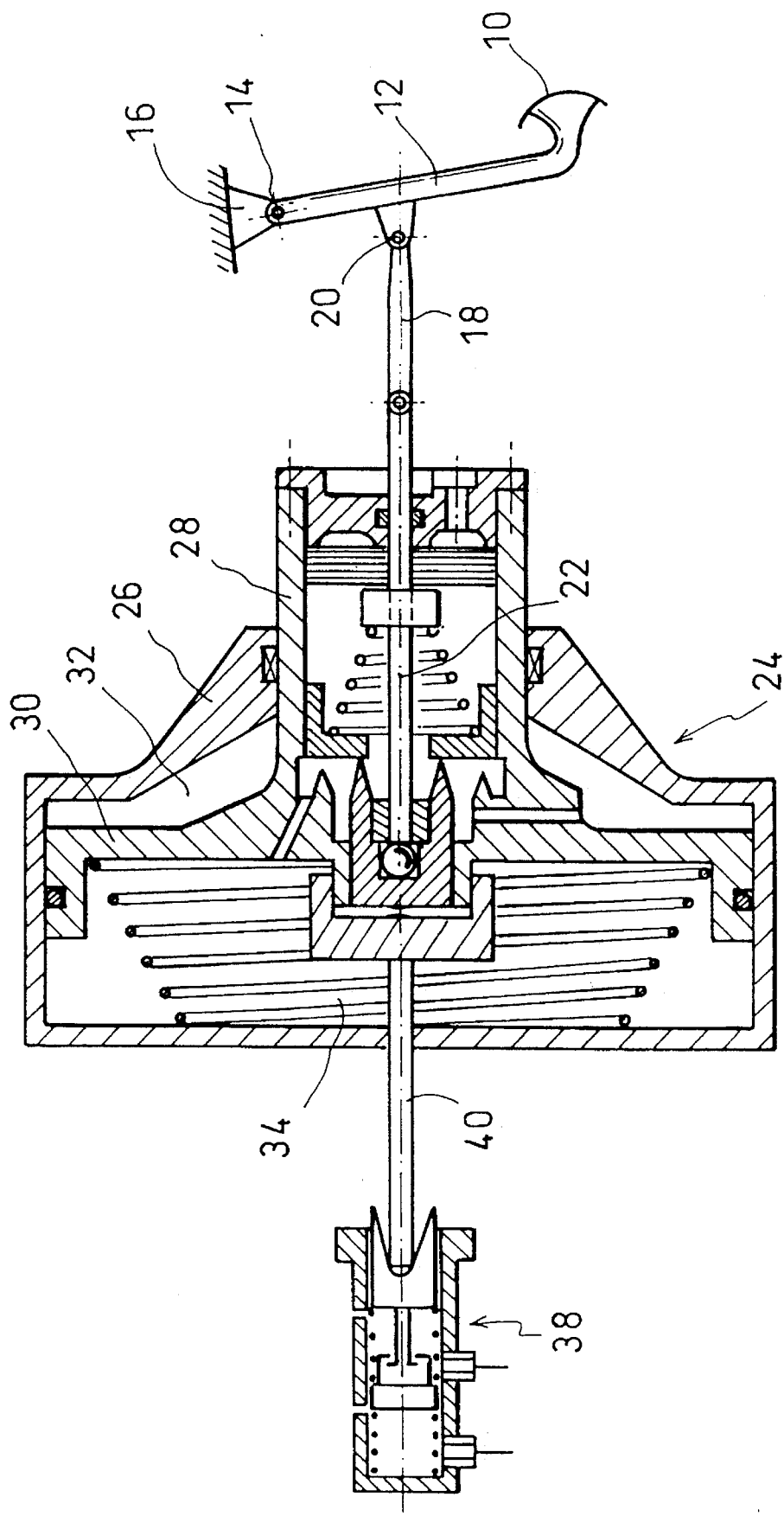
FIG_1

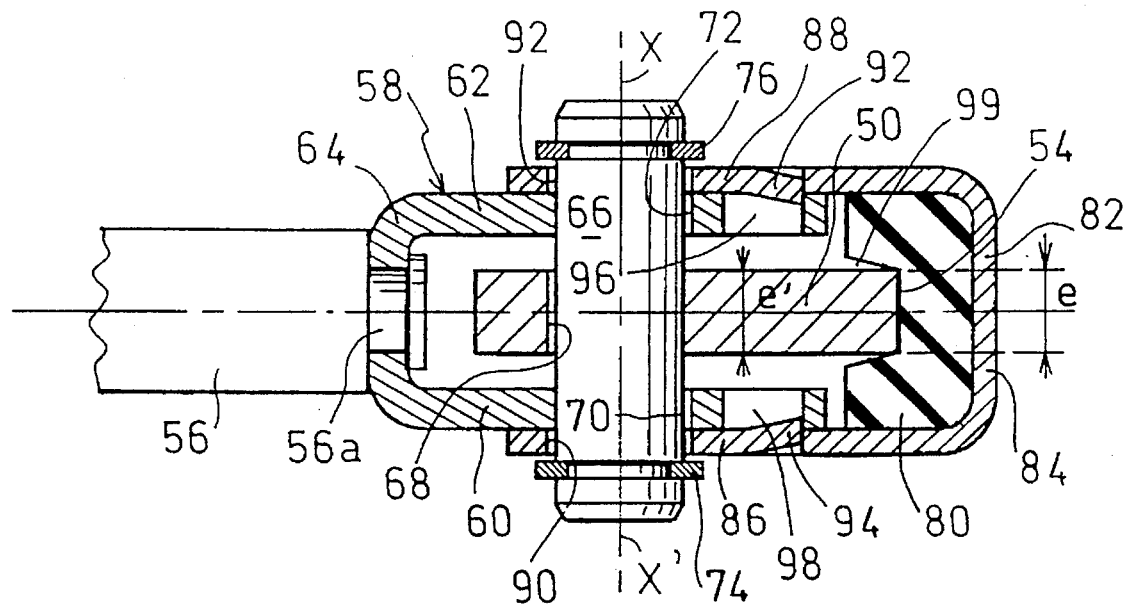
FIG_2
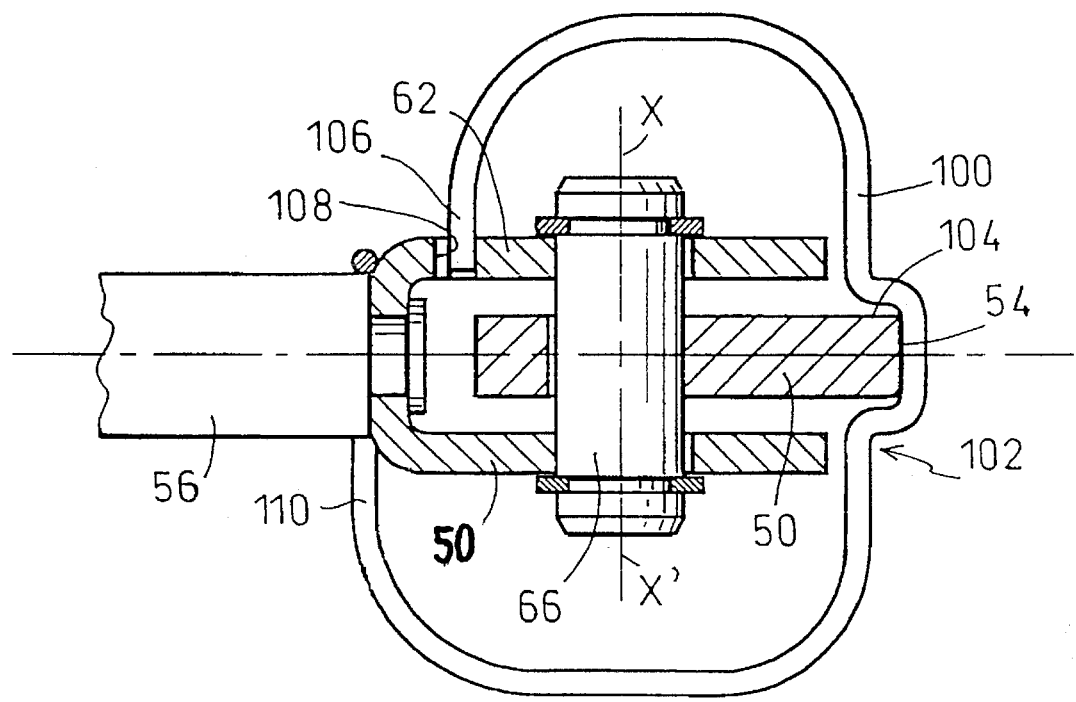
FIG_5

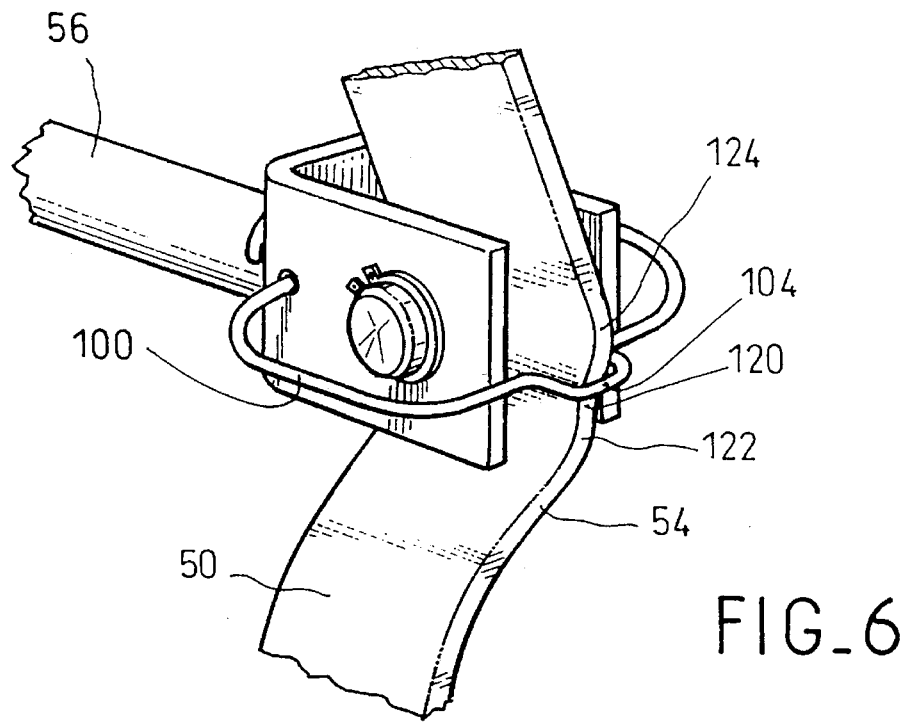
FIG_6
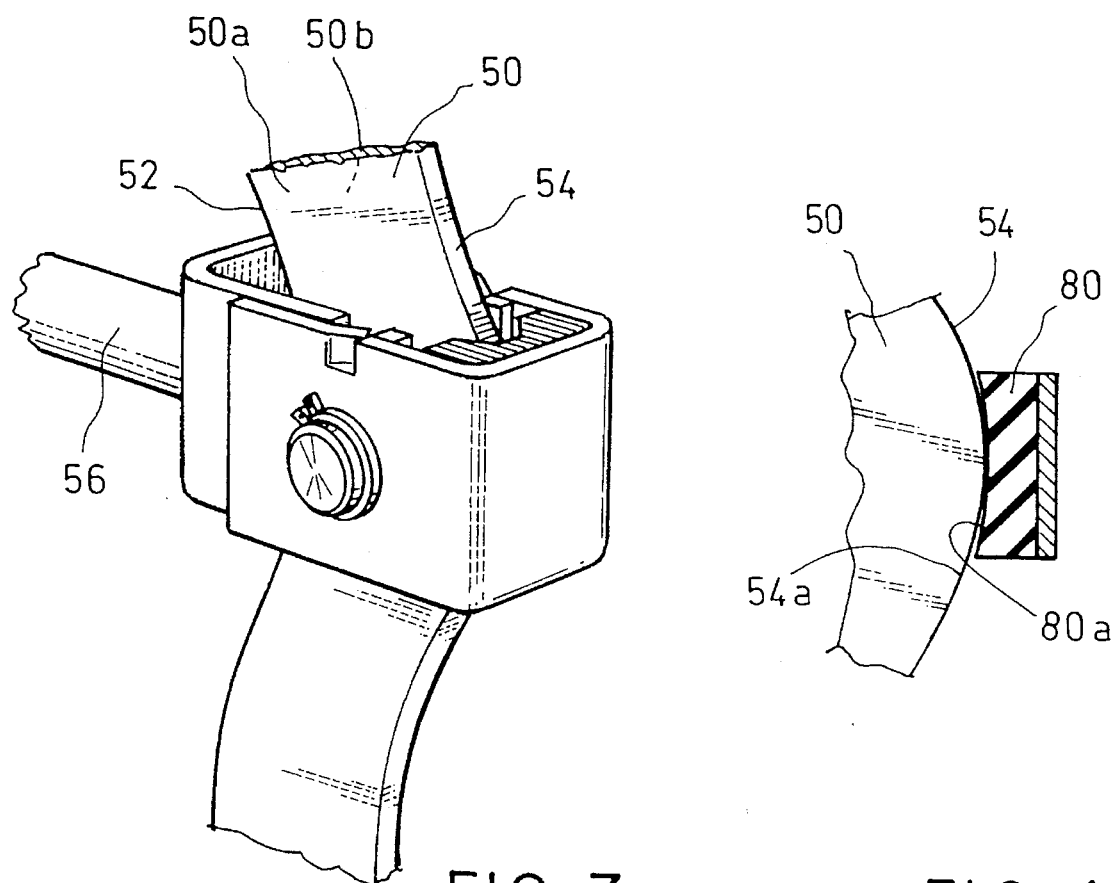
FIG_3  FIG_4

PEDAL DEVICE FOR A MOTOR VEHICLE, PARTICULARLY FOR A BRAKE SYSTEM

The present invention has as its subject a pedal device for a motor vehicle, particularly but not exclusively for a motor vehicle brake system.

More precisely, the invention relates to a pedal device as defined in the preamble of the main claim.

In a motor vehicle, braking is controlled by the driver by means of a pedal which transmits, usually through the intermediary of a booster, the control of braking to the master cylinder, the latter producing the effective actuation of the brakes.

FIG. 1 shows in simplified manner such a brake system. The pedal 10 is shown which is attached to the end of a first rod 12 and the second end 14 of which is articulated about an axis fixed with respect to the body 16 of the motor vehicle. The movements of the pedal 10 are transmitted through the intermediary of a control rod 18 articulated at 20 with respect to the first rod 12. The control rod 18 is extended at 22 into the brake-booster 24. As is well known, the booster 24 consists essentially of a casing 26 in which is mounted a piston 28 and a piston skirt 30 which, associated with a deformable diaphragm, separates the casing 26 into two chambers 32 and 34. Under the effect of the movements of the rod 22, it is possible to place the chamber 32 either under partial vacuum, or under atmospheric pressure. The placing of the chamber 32 under atmospheric pressure under the effect of the rod 22 causes the movement of the piston skirt 30 which controls the master cylinder 38 through the intermediary of the thrust rod 40.

The type of mechanical connection between the first rod and the control rod 18 of the pedal system per se offers great safety and high reliability. However, the assembly has the disadvantage that the vibrations of the engine, and more generally of the motor vehicle, are transmitted to the pedal 10. In fact, in these systems, there always exist clearances which allow the rod 12 to be set in final vibration. This vibration presents no risk as to the safety of the braking system but they are unpleasant to the foot of the motorist and in addition they cause noises to be produced which impair the comfort of the motorist in his or her vehicle.

The document DE-U-8,816,385 describes a device which seeks to solve this problem but which in fact does not enable the noises associated with the vibrations of the pedal in a plane perpendicular to the direction of its actuation to be avoided.

One object of the present invention is to provide a pedal device for a motor vehicle, in particular for the brake system of the latter, which palliates the above-mentioned disadvantages and which, in particular, avoids or very substantially reduces the transmission of vibrations from the engine to the pedal, particularly to the brake pedal.

In order to achieve this object, the pedal device of the invention for a motor vehicle, which comprises resilient means for holding part of the wall of the aperture of the first rod against the facing part of said pivot pin, is essentially characterized in that the resilient means comprise means for substantially immobilizing the first rod in translation relative to said yoke in the direction of the pivot pin.

It will be understood that the transmission is thus avoided of vibrations resulting not only from the clearance between the first rod and the pivot pin in the direction of actuation of the pedal, but also from the clearance in the direction of the pivot pin.

According to a first embodiment of the invention, the resilient means comprise a part of resilient material, for example of elastomeric material or of rubber, and mechanical means for maintaining the part of resilient material against the second side of the first rod.

According to a second embodiment of the invention, the resilient means comprise a spring-forming member, the ends of which are securely attached to the yoke and a middle portion of which is applied onto the second side of the first rod.

Several embodiments of the invention will now be described by way of example with reference to the accompanying drawings in which:

FIG. 1 already described, shows a pedal device for braking according to the state of the art FIG. 2 is a view in horizontal cross-section of part of the pedal device according to a first embodiment of the invention;

FIG. 3 is a view in perspective of the pedal device of FIG. 2;

FIG. 4 is a partial view in vertical cross-section of FIG. 3 showing the interaction between the first rod and the resilient maintaining system;

FIG. 5 is a view in horizontal cross-section of a second embodiment of the invention; and FIG. 6 is a view in perspective of the second embodiment of the invention.

With reference first of all to FIGS. 2 to 4, a first embodiment of the pedal device will be described. These figures show the first rod 50, the lower end of which is securely attached to the pedal per se, not shown, and the upper end of which is articulated with respect to the body of the vehicle. This rod 50 is of rectangular cross-section and therefore comprises two flat surfaces 50a and 50b as also a side termed front 52 and a side termed back 54. The control rod which here bears the reference 56 has its end 56a which is securely attached to a yoke 58. More precisely, the yoke 58 comprises two parallel arms 60 and 62 connected by a base 64. The end 56a of the rod 56 is securely attached to the yoke 58 by its base 64. The yoke 58 is mounted so as to pivot with respect to the first rod 50 through the intermediary of a pivot pin 66. The pivot pin 66 is engaged in an aperture 68 of the rod 50 and in two apertures 70 and 72, respectively made in the arms 60 and 62 of the yoke 58. Circlips 74 and 76 immobilize the pivot pin 66 in translation in the direction of its geometrical axis XX'.

As has already been indicated, according to an essential feature of the invention, the first rod 50 is held against the pivot pin 66 by a resilient system. According to the first embodiment shown in FIGS. 2 to 4, the resilient system is constituted by a part or buffer of elastomeric material 80 or of rubber. This part is securely attached to the yoke 58 by a caliper 82 which comprises a base 84 and two arms 86 and 88. These arms are engaged on the pivot pin 66 by apertures 90 and 92. The caliper 82 is immobilized with respect to the yoke 58 by two catches 92 and 94 which enter corresponding apertures 96 and 98 of the arms of the yoke 58. The rod 50 is thus inserted between the yoke 58 and the caliper 82.

As can be seen better in FIG. 2, the elastomeric buffer 80 comprises a recess 99 into which penetrates the back side 54 of the first rod 50. The recess has at its bottom a width e which is substantially equal to the thickness e' of the rod 50. As FIG. 2 in particular shows, the action of the elastomeric buffer 80 on the side 54 of the rod 50 tends to hold the wall of the aperture 68 against the surface of the pivot pin 66 in a zone which is diametrically opposite the base 64 of the yoke 58. The effect of the clearance between the rod 50 and the pivot pin 66 in a direction perpendicular to the axis XX' of the pivot pin 66 is thus eliminated. Because of the interaction of the recess 99 of the buffer 80 with the flanks of the rod 50, that is to say its main surfaces 50a and 50b, there is also an immobilization of the rod 52 with respect to the pivot pin 66 in the direction XX'.

According to a preferred embodiment shown by FIG. 4, the side 54 of the rod 50 has a convex incurvate portion 54a in its portion which interacts with the resilient part 80. Preferably, the part 80 equally has a concave incurrate surface 80a in the zone of contact with the side 54.

As FIG. 4 shows, the radius of curvature of the incurvate portion 80a of the part 80 is greater than that of the incurrate portion 54a of the corresponding part 50. An optimal action of the resilient part 80 of the rod 50 is thus ensured.

With reference now to FIGS. 5 and 6, a second embodiment of the invention will be described. This second embodiment is distinguished from the first only by the structure of the resilient means for maintaining the rod 50 on the pivot pin 66. As FIGS. 5 and 6 show, the resilient maintaining means are constituted by a metal wire 100 of circular cross-section constructed of a spring steel or any other metallic material having the same properties. The wire 100 comprises a middle part 102 which interacts with the side 54 of the rod 50. In this middle part, the wire 100 is deformed so as to constitute a sort of housing 102 for the side 54 of the rod 50. The wire 100 is bent and has a first end 106 which is engaged in an aperture 108 of the branch 62 of the yoke whereas its other end 110 forms a bent back part which surrounds the control rod 56 at its end securely attached to the base of the yoke 58. It will be understood that the whole of the metal wire 100 is thus immobilized in translation in the direction of the axis XX' of the pivot pin 66 and also in an orthogonal direction corresponding to the direction of the arms of the yoke 58. As a result of this, the rod 50, because of the interaction of its side 54 with the recess-forming portion 104 of the wire 100, is also on the one hand applied against the pivot pin 66 and immobilized in translation in the direction XX'. In this case again, the assembly clearances are prevented from allowing parasitic noises to be produced.

As FIG. 6 shows, preferably, the side 54 of the rod 50 comprises a concave incurvate portion 120 connected to the running part of the side 54 by two extensions 122 and 124. The incurvate part 104 of the resilient wire 100 interacts with the rod 50 in the portion 120 of its side 54 which is concave.

We claim:

1. A pedal device for a motor vehicle, comprising a first rod having a first end articulated on the vehicle and a second end attached securely to said pedal and a control rod, the control rod having a first end articulated by connecting means on a middle part of the first rod and a second end which interacts with a control assembly, the connecting means comprising a yoke having a base and two substantially parallel arms, said base attached securely to the first end of the control rod, a pivot pin engaged in an aperture of said first rod and in two apertures of said yoke, said first rod engaged between the arms of said yoke and having a first side toward said control rod and a second side, and resilient means bearing against said yoke so as to hold part of a wall of the aperture of the first rod against said pivot pin, characterized in that said resilient means comprises means interacting with the second side of the first rod for substantially immobilizing said first rod in translation relative to said yoke in the direction of said pivot pin.

2. The pedal device according to claim 1, characterized in that said resilient means comprises a part of resilient material and mechanical means for maintaining said part of resilient material against said second side of the first rod.

3. The pedal device according to claim 2, characterized in that the mechanical maintaining means comprises a caliper having two branches and a base part, said part of resilient material being attached securely to said base part and said branches attached securely, respectively, to the arms of said yoke.

4. The pedal device according to claim 2, characterized in that said part of resilient material comprises a recess in which is engaged the second side of said first rod, the width of said recess in the direction of the pivot pin being substantially equal to the thickness of said second side in said direction.

5. The pedal device according to claim 4, characterized in that the bottom of said recess of said part of resilient material has, in a plane orthogonal to said pivot pin, an incurvate cross-section interacting with an incurvate portion of the second side of said first rod.

6. The pedal device according to claim 1, characterized in that said resilient means comprises a spring-forming member having ends attached securely to said yoke and a middle portion of which is applied onto the second side of said first rod.

7. The pedal device according to claim 6, characterized in that the ends of said spring-forming member are attached securely to said yoke in order to immobilize in translation, in the direction of the pivot pin, said spring-forming member, and in that said middle portion of the spring-forming member has a recessed portion interacting with said second side of the first rod and with flanks of said second side.

8. The pedal device according to claim 6, characterized in that the second side of said first rod comprises a concave incurvate portion connected to the second side by two extensions, said spring-forming member interacting with said concave portion.

9. The pedal device according to claim 6, characterized in that said spring-forming member is a metal wire of circular cross-section constructed of a metallic material.

* * * * *